United States Patent [19]

McConnell

[11] 3,711,010
[45] Jan. 16, 1973

[54] AUTOMATIC FUSION WELDER FOR STRUCTURAL STEEL MEMBERS

[76] Inventor: John R. McConnell, 148 Woodside Avenue, Ridgewood, N.J. 07450

[22] Filed: Jan. 20, 1970

[21] Appl. No.: 4,359

[52] U.S. Cl. ..................228/4, 29/471.1, 219/125
[51] Int. Cl. ..........................B23k 1/00, B23k 37/04
[58] Field of Search ..........228/13, 4, 44; 219/78, 74, 219/125; 29/470, 484, 471.1

[56] References Cited

UNITED STATES PATENTS

| 3,401,254 | 9/1968 | McConnell | 219/125 |
| 3,159,129 | 12/1964 | Lindmark | 113/131 |
| 3,291,360 | 12/1966 | Linnander | 228/44 |
| 3,576,421 | 4/1971 | Fiegel, Jr. | 219/130 |

Primary Examiner—John F. Campbell
Assistant Examiner—R. J. Craig

[57] ABSTRACT

The apparatus shown, generally using special end connection details, completely fabricates a floor beam by the fusion welding of said details at the ends of the raw shape in a single continuing automatic handling of the work material without manual labor.

This apparatus uses opposite-hand dual fusion welders pre-located on a common track to suit the overall length of the floor beam being fabricated. Dual transverse belt conveyors integrally mounted on the inner toes of the said welders receive successive raw shapes from protective cushioning intermediate lowering devices that receive said shapes from an overhead travelling crane. Co-ordinated forward actuation of the conveyors brings the shape to stop tabs to locate it under the operating centers of the end-located dual welders. Elevated above the belt by dual vertically projectible rollers, longitudinal equally projectible angle-carrying rams length center the shape for equal overhang of the end connection details. After the rams are slightly retracted to proper length, the welding carriages mounted on the top of each of the dual welders, magnetically tracing inserted patterns, fusion-weld the connection details to the shape and into the flanges to complete the mechanical fabricating of the said floor beam. With stop tabs withdrawn, the beam is lowered to the belts for forwarding to discharge for removal by overhead crane or other means out of the general area.

2 Claims, 11 Drawing Figures

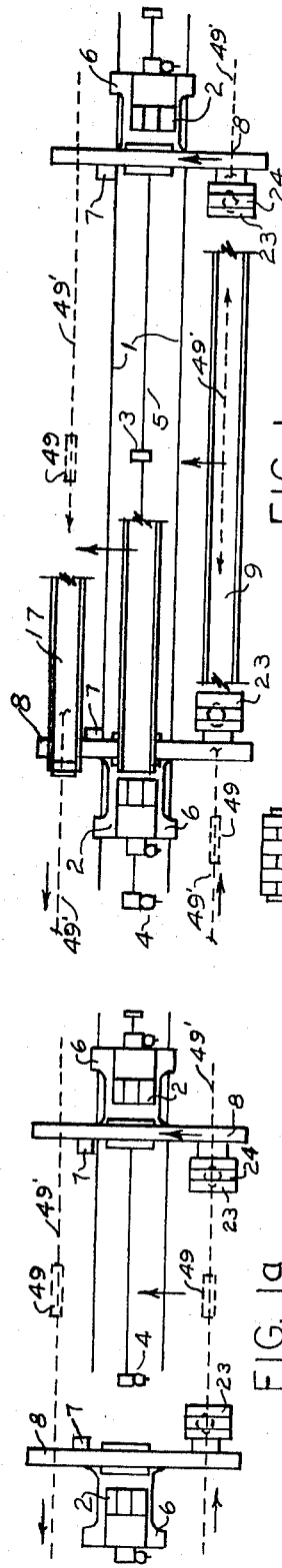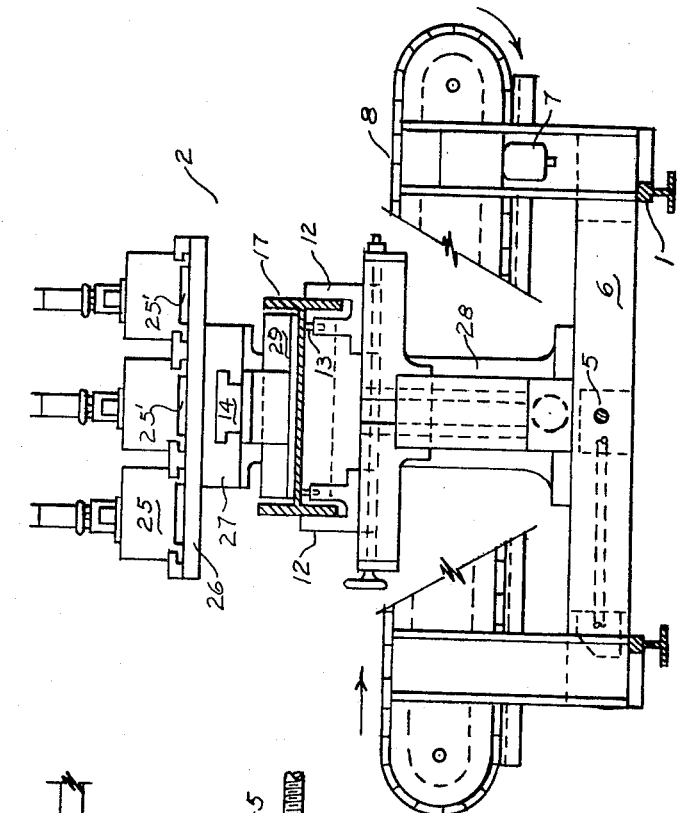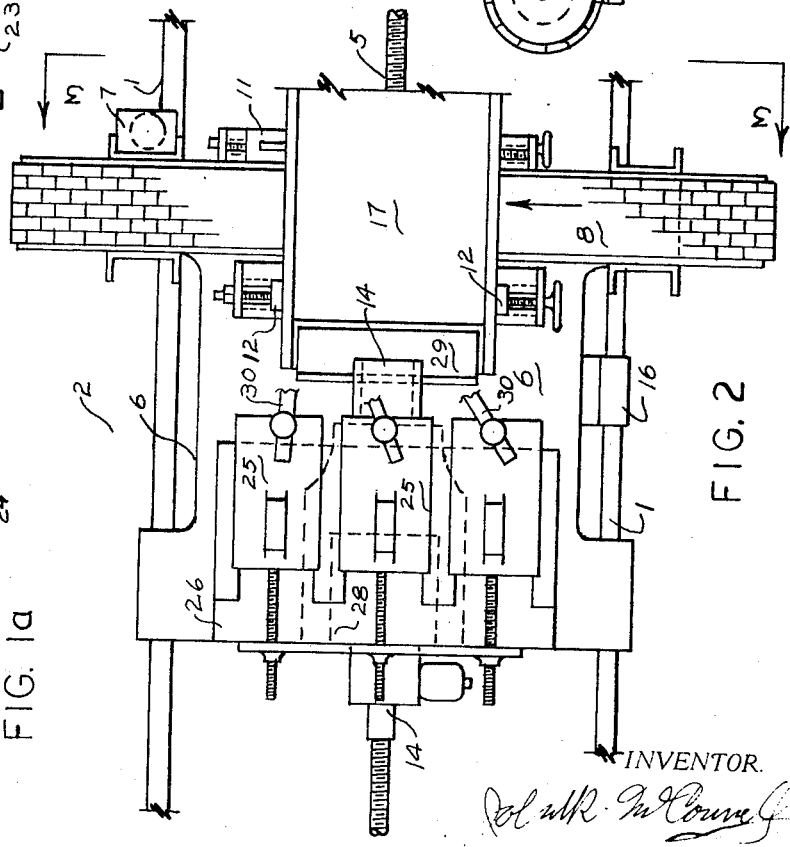

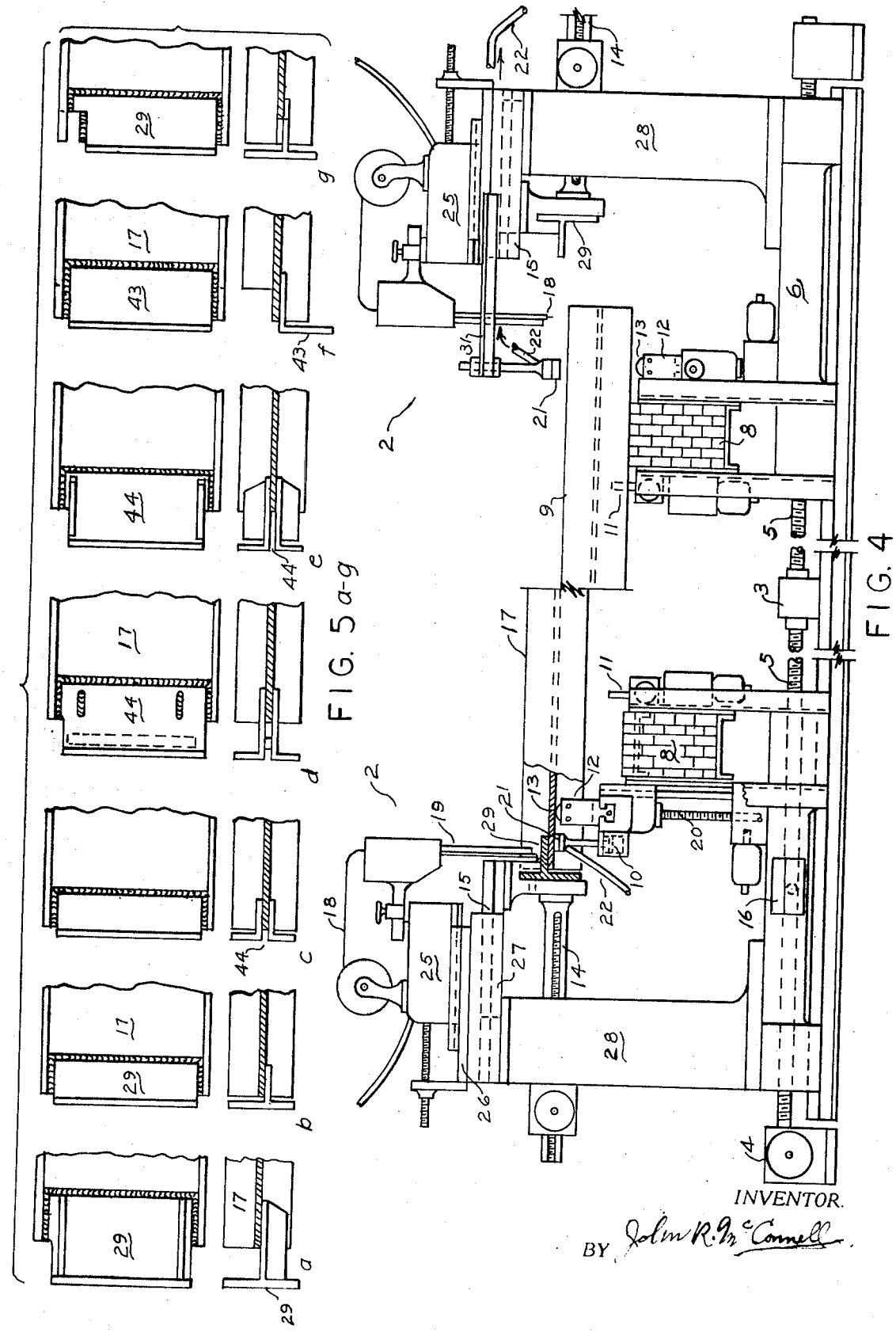

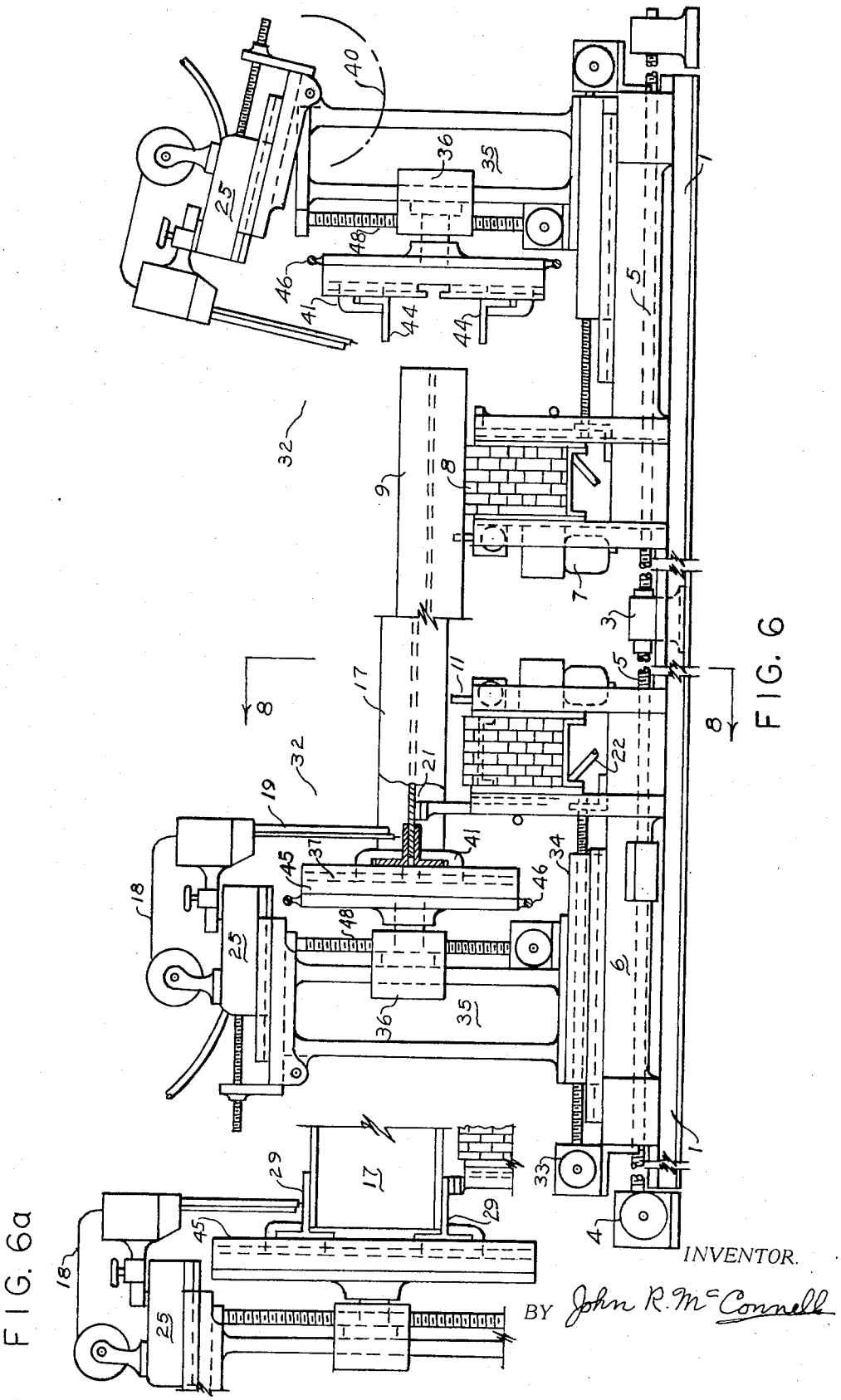

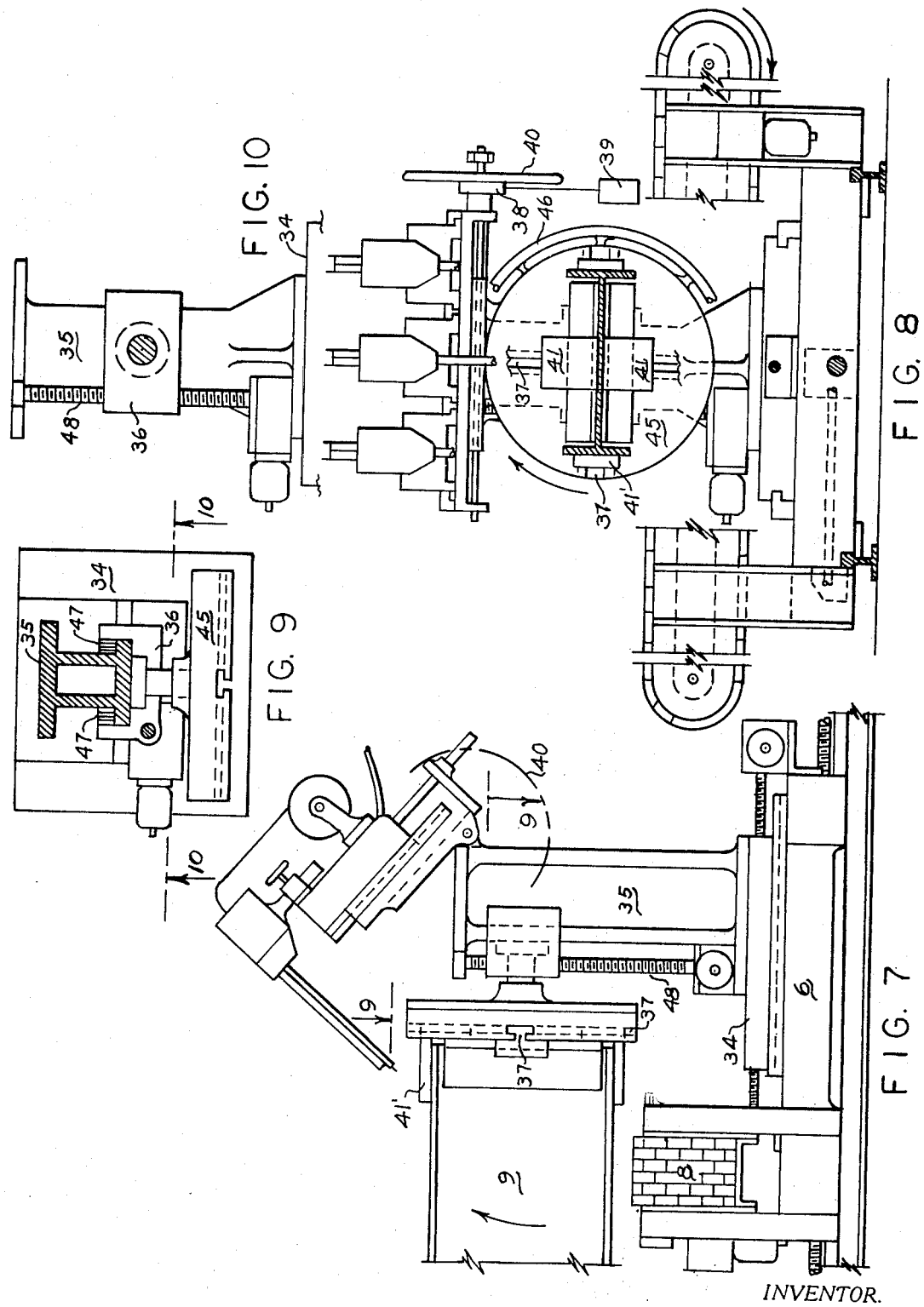

AUTOMATIC FUSION WELDER FOR STRUCTURAL STEEL MEMBERS

This invention relates to fundamental improvements in and additions to and extensions of the scope of applicant's U.S. Pat. No. 3,401,254 of Sept. 10, 1968.

It is an object of the present invention to eliminate certain mechanisms, combine other plural mechanisms or means into single mechanisms, to reduce costs and to add other new features that will improve and extend the scope and usefulness of the apparatus.

It is also an objective to use certain types of extended-end connection details, peculiarly suited to the apparatus, that enable completely finished floor members to be fabricated in a single continuing operation.

Another objective is to build into the apparatus certain safety features, that also facilitate the handling of the work material.

All of the objectives of the original patent are retained.

For other objectives and a better understanding of the invention reference may be had to the following detailed description, taken in conjunction with the accompanying drawing in which:

FIG. 1 is an overall plan of the layout of the apparatus.

FIG. 1a is an alternate layout of the apparatus of FIG. 1.

FIG. 2 is an enlarged detail of the left fabricator of FIG. 1.

FIG. 3 is an end elevation of the welder-fabricator of FIG. 2.

FIG. 4 is a front elevation of the apparatus of FIG. 1.

FIG. 5 is a front elevation and cross-section of various connection details executed by the apparatus.

FIG. 6 is a front elevation of an alternate apparatus that includes a built-in rotative mechanism for welding connection details to both sides of the web of shape.

FIG. 7 is a front elevation of the right hand alternate welder of FIG. 6 rotating the shape.

FIG. 8 is an end view of the left-hand alternate welder taken on FIG. 6.

FIG. 9 is a cross-section of the standard and chuck taken on line 9—9 of FIG. 7.

FIG. 10 is a front elevation of the standard taken on line 10—10 of FIG. 9.

FIG. 1, an overall layout of the apparatus, shows a two-rail track 1 supporting mobile dual fusion welding-fabricating units 2 symmetrically spaced about a central anchorage 3, that longitudinally anchors a common powered 4 threaded shaft 5 oppositely threaded through the bases 6 of the dual welders for converging or diverging of same to any required longitudinal spacing. Powered motor 7 transverse multiple-strand chain conveyor belts 8 integrally mounted on the inner toes of the welders move a raw structural steel shape 9 forward to be located under the welding carriages 25 by adjustable stop tabs 11. Elevated by powered screw 20 the insulated four-tongued vises 12 of FIG. 3 and 4 having thick replaceable insulating rollers 13 in the inner tongues raise the shape evenly off the belts by the web for smooth accurate length-centering by the combined length centering and tee carrying rams 14. On closure of the dual vises the shape is locked by the outside tongues against displacement and vibration. The rams are then diverged to marks on the tee slides 15 that, with the dials 16 on the bases, indicate the precise overall length of the required finished member 17. As shown in FIG. 4 the gap between the upper surfaces of the web and the ends of the welding wire 18, electrode or gas-flame and the flux-feed tube 19 are set and maintained depending on the type of fusion welding used. At the left of FIG. 4 a piston-projected 10 insulated grounding bar 21 and cable 22 attached to the base of the vise is flexibly pressed against the under-web surface to complete the circuit if electric welding is employed. At the right an alternate sprung grounding arrangement 31 is shown. On completion of welding the vises are lowered and released, grounding bars withdrawn, stops retracted and the belts supporting the finished shape are actuated to carry the completed member forward to discharge for removal by travelling hoist 49 on overhead rail 49'.

Small rubber tired floor trucks 23 carrying vertical compressed air cylinders, pistons and piston rods terminating in heavy steel top castings 24 extend above the level of the belts to initially receive the lowered raw shapes and to prevent damage to the belts by careless lowering and placement of said shapes directly on the belts. After the preceding shape has been welded and lowered to the belts, the rectangular rests 24 carefully lower the succeeding shape for forwarding to the operational area. The trucks would be flexibly connected to the conveyor frame by rubber pads to prevent transmission of shocks and vibration. As a secondary use, while elevated, the ends of the shape can be wire brushed or flame cleaned if required, to obtain a sound satisfactory weld. Also beam ends can be manually flame-coped.

An alternate layout (FIG. 1a) of FIG. 1 is that the left-hand combined welder-conveyor-cushioning truck would be fixed in location, with only the similar right-hand mechanism mobile on the track. This would produce substantial economies in the cost of the apparatus.

FIG. 2, an enlarged plan of the left welder, shows plural self-propelled welding carriages 25 slidably mounted on a table 26 overhanging the tee-slotted bracket 27 atop the vertical standard 28 of FIG. 3 and 4. The end of the ram 14 tee-keyed into the bracket 27 holds a connection-tee detail 29 against the web of the shape for welding by the truncated welding arms 30.

FIG. 3 shows the operating end of welder with the shape stopping mechanism 11 removed for clarity. Magnetic mechanisms in the welder carriages follow changeable patterns inserted in the spaced 25' under the carriages.

In FIG. 4 and elsewhere due to the many variations in types and details of fusion welding equipment a nominal hybrid representation of this equipment is shown.

FIG. 4 a fore-shortened front elevation of the apparatus shows at left the shape in welding position and at right the shape moving into position for welding. The rams 14 are powered by matched, equally powered and equally projectible known electronic and mechanical means. An alternate sprung-arm 31 grounding arrangement at the right eliminates power and much mechanism.

FIG. 5 a–g show sectional plans and elevations of various proposed single angle 43, double angle 44 and tee 29 connection details at each end of beams. The ends of these details adjacent to the inside surfaces of the flanges are welded by the apparatus directly into the flanges of the shape giving a much stronger connection. FIG. 5a, 5d and 5g eliminate the necessity of coping the shape ends for a flush fit to the top of a supporting girder. FIG. 5a and 5e have tabs to increase strength and rigidity. Outstanding legs are pre-drilled for attachment.

FIG. 6 shows the front elevation of an improved version of a welding apparatus 32 for attaching double angles connection details, that incorporates a shape revolving mechanism directly into the apparatus. This avoids the necessity of having to reverse the belts and withdraw the shape from the previous apparatus and after revolving to re-introduce it for completion. It avoids the danger to personnel and equipment in revolving the shape. It also permits the welding of connection details tees to the flanges of shape for wind bracing as in FIG. 6a. This single machine can process all variations of this general class of work safely and expeditiously. The plan-layout would be similar to that shown in FIG. 1 substituting welder units 32 for those of 2.

At the left on welder base 6 a powered 33 longitudinally guided sub-base 34 having an outward vertical standard 35 is provided to permit the dual welders to be diverged to permit the transverse entrance of the raw shape. On the inward (operating) side of the standard, a runner 36 vertically raiseable by a powered screw 48 supports a four-jaw chuck 45, with perpendicular tee-slots 37 for the clamping of the shape in two directions and for it's rotation and welding.

The under carriage; rails, conveyors, relocating, grounding and similar items are set up and operate generally as in FIG. 1 and 4.

At the right the welder is shown in retracted position for the movement of the shape into the welding area. The welding carriages are vertically rotated upwards by an eccentrically 38 counter-weighted 39 hand-wheel 40, the angle-carrying clamps 41 are loaded with double end connection-angles 44 and it is ready for longitudinal converging, to length center the shape and to place and clamp the angles against the shape for welding thereto. Rotating of the shape as in FIG. 7 permits the welding of the second angle.

At the left is shown the dual opposite-hand welder converged, with the shape raised off the conveyor belt by the angles, ready for welding.

FIG. 6a shows in part a slightly higher apparatus for swinging a larger diameter chuck 45 for the welding of wind-bracing connection tees or angles to the flanges of the shape.

FIG. 7 shows the right hand dual welder revolving the shape with the welding carriages rotated upwards for clearance.

FIG. 8 shows an end view of the left hand welder of FIG. 6, with the eccentric counter-weighted hand wheel 40 and the circumferential hand-ring 46 for the revolving of the balanced shape.

FIG. 9 shows a cross-section of the vertical standard with the retaining blocks 47 adjustable for wear and the mounted chuck.

FIG. 10 shows an elevation of the standard taken on line 10—10 of FIG. 9.

Although not fully particularized the apparatus will be fully insulated and grounded.

In fundamental improvement of and additions and extensions to the original patent:

The power mechanism or means for the elevation of the detail holder and the welding carriages is eliminated.

The detail holder is combined with the length centering ram, that effectuates the elimination of the ram mechanism but retains the action of the ram.

The longitudinal keyed shaft in the dual bases with the dual trains of gears and shafts is eliminated by the use of matched dual equally powered and equally projectible powered rams, that also place the tee details.

The power and mechanisms required to operate the grounding bars is eliminated by the use of the sprung grounding bars, shown at the right side of FIG. 4.

In FIG. 1A the fixation of the let-hand welding unit considerably economizes in the cost and simplifies and improves operation of the apparatus.

Provision of new shape locking vises hold the shape steady against shifting and vibration.

The new insulating rollers in the insulated vises permit smooth, easy and accurate length centering, eliminating wracking of the chain link belts.

The new cushioning trucks alongside the front ends of the conveyors avoid damage due to careless lowering of the shapes. Avoids shock and vibration to the welding operation.

They also permit wire brush cleaning or flame coping at the ends of the shape before welding.

The revised general arrangement as shown in FIG. 4 permits the shapes to move through and to be welded without any vertical movement of the welding carriages of their supports.

A substantial variety of new improved connection details, in general agreement with those approved by the American Institute of Steel Construction and Building Codes, is set forth.

The addition of a shape-cutting capacity enlarges the scope.

In general, the improved apparatus having less height, stronger vertical standards, less overhang and fewer sliding and moving parts, improves control and visibility of the operation, with better accuracy and speed.

The introduction of the new complete mechanized overall handling and transmission of the shapes into the "feeding to" and the "removal from" the apparatus extends the usefulness of the system.

The above remarks apply particularly to FIG. 1 to 5 of this application and apply substantially to the considerably different solution of the problem of efficiently applying connection angles to both sides of the web of the shape at each end of the shape, as shown in FIG. 6 to 10.

In the latter apparatus:

Where double angles are required, the longitudinally adjustable sub-bases with the shape holding chucks introduce into the floor apparatus a means of rotating the shape without re-introducing the material a second time. Shapes are completely fabricated in a single handling.

It also permits the welding of wind-bracing connection tees to the flanges of the shape. By the term "powered" is meant the equipment means used in elevating, rotating, guiding, or moving a device or object, whether by applied electric current, fluid pressure, manual effort or other agent.

What I claim as new and desire to protect by Letters Patent of the United States is:

1. An improved electric arc welding apparatus for assembly-fabrication of steel building members comprising, dual mobile electric welding units relatively pre-locateable on a common longitudinal guiding means wherein, the operating ends of said co-ordinated opposite-hand welding units face inwardly on a common operating center-line over the centrally located work material, each of said units having a base, an outward vertical standard and a top-mounted table projecting inwardly above a transverse shape conveyor mounted above the inward projection of the said base, a shape ram longitudinally extendible through the said vertical standard, a table mounted mobile carriage carrying dependent weld-performing means, a welding circuit and powered moving and operating means for a shape to be welded whereby the shape is transversely conveyed into and located in the operating area, whereby said rams length-center said shape and place connection details to be welded on the shape web, wherein said welding means manually guided around the outline of the connection detail on the shape web welds the assembled work material together.

2. An improved welding apparatus as in claim 1 further comprising, powered mobile hoists equipped with shape grips, longitudinally operable along dual overhead trolley rails for the transfer of shapes to and away from the feed and discharge sides of the said welding apparatus.

* * * * *